(12) United States Patent
Mabuchi et al.

(10) Patent No.: US 8,225,899 B2
(45) Date of Patent: Jul. 24, 2012

(54) VEHICLE BODY MOUNTING STRUCTURE FOR EXHAUST SYSTEM HEAT EXCHANGER

(75) Inventors: Tomoki Mabuchi, Toyota (JP); Hisashi Nishino, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1370 days.

(21) Appl. No.: 11/892,536

(22) Filed: Aug. 23, 2007

(65) Prior Publication Data

US 2008/0066886 A1 Mar. 20, 2008

(30) Foreign Application Priority Data

Aug. 30, 2006 (JP) ................ 2006-233999

(51) Int. Cl.
*B60K 13/04* (2006.01)
(52) U.S. Cl. ........................ 180/296; 180/309
(58) Field of Classification Search .......... 180/296, 180/309; 296/204, 208
See application file for complete search history.

(56) References Cited

U.S. PATENT DOCUMENTS

| 5,195,607 | A * | 3/1993 | Shimada et al. | 180/296 |
| 6,604,781 | B2 * | 8/2003 | Uchida | 296/204 |
| 7,364,002 | B2 * | 4/2008 | Mabuchi et al. | 180/296 |
| 7,383,912 | B2 * | 6/2008 | Kondo et al. | 180/296 |
| 2004/0099465 | A1 | 5/2004 | Matsumoto et al. | |

FOREIGN PATENT DOCUMENTS

| JP | U-57-150215 | 3/1981 |
| JP | A-58-211976 | 12/1983 |
| JP | U-63-100624 | 6/1988 |
| JP | U-2-59080 | 4/1990 |
| JP | A-2001-073769 | 3/2001 |
| JP | A-2001-294029 | 10/2001 |
| JP | A-2004-025980 | 1/2004 |
| JP | A-2004-306809 | 11/2004 |
| JP | A-2005-119493 | 5/2005 |
| JP | A 2006-105464 | 4/2006 |
| JP | A-2006-220037 | 8/2006 |
| KR | 1999-0029261 | 7/1999 |
| KR | 2001-0004817 | 1/2001 |

OTHER PUBLICATIONS

European Search Report issued on Oct. 21, 2009 in European Patent Application No. 07016856.2.

* cited by examiner

*Primary Examiner* — John Walters
(74) *Attorney, Agent, or Firm* — Oliff & Berridge, PLC

(57) ABSTRACT

A vehicle body mounting structure for an exhaust system heat exchanger is provided that enables good protection of an exhaust system heat exchanger disposed below a vehicle body floor. In the vehicle exhaust system mounting structure 10 there is an exhaust system heat exchanger 14, carrying out heat exchange between exhaust gas and engine cooling water, disposed at the bottom side of a floor tunnel 70 that is formed to a front floor panel 68. The lowermost portion of the exhaust system heat exchanger 14 in the vehicle up-down direction is positioned in the vehicle up-down direction above the lowermost portion of the body cross-member 80 of a vehicle body frame and an engine rear mount support member 90.

23 Claims, 10 Drawing Sheets

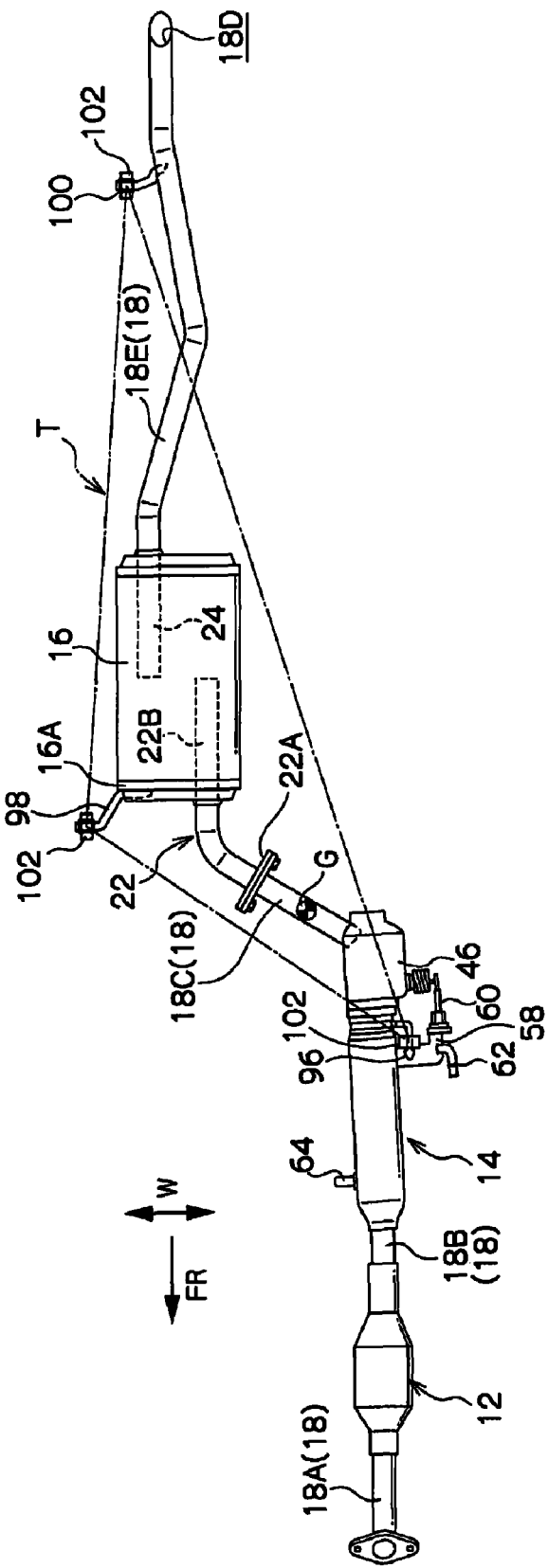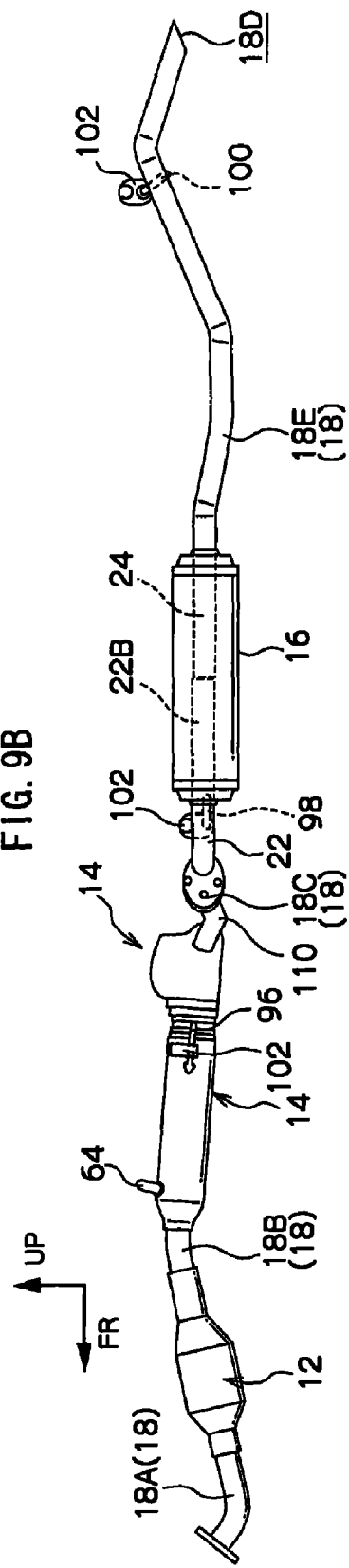
FIG. 9A
FIG. 9B

VEHICLE BODY MOUNTING STRUCTURE FOR EXHAUST SYSTEM HEAT EXCHANGER

CROSS-REFERENCE TO RELATED APPLICATION

This application claims priority under 35 U.S.C 119 from Japanese Patent Application No. 2006-233999, the disclosure of which is incorporated by reference herein.

BACKGROUND OF THE INVENTION

1. Field of the Invention

The present invention relates to a vehicle body mounting structure for an exhaust system heat exchanger, for mounting to a vehicle an exhaust system heat exchanger that carries out, for example, heat exchange between an automobile's exhaust gas and a cooling medium.

2. Description of the Related Art

A structure is known in which an exhaust system heat exchanger that carries out heat exchange between exhaust gas and a cooling water is provided disposed between a catalytic convertor and a muffler in an exhaust system for exhausting exhaust gas from an engine, such as described in Japanese Patent Application(JP-A) No. 2006-105464.

However, in the above described conventional technology, when the exhaust system heat exchanger is disposed below the vehicle body floor, protection of the exhaust system heat exchanger from interference with the road surface and flying stones and the like has not been considered.

The present invention has been made in the light of the above circumstances and an object thereof is to provide a vehicle body mounting structure for an exhaust system heat exchanger that may afford good protection to an exhaust system heat exchanger disposed below the vehicle body floor.

SUMMARY OF THE INVENTION

A vehicle body mounting structure for an exhaust system heat exchanger of a first aspect of the present invention mounts an exhaust system heat exchanger that is the exhaust system heat exchanger carrying out heat exchange between exhaust gas and a cooling medium is positioned in the vehicle up-down direction above the lowermost portion in the vehicle up-down direction of a vehicle body frame.

By the above aspect, since the vehicle body frame projects in the vehicle up-down direction below the exhaust system heat exchanger, if there is any road surface interference that develops, the vehicle body frame readily contacts the road surface. Therefore, the exhaust system heat exchanger may be protected against road surface interference.

In such a manner, in the vehicle body mounting structure for an exhaust system heat exchanger of the above described aspect, the exhaust system heat exchanger disposed below the vehicle body floor may be well protected. It should be noted that the exhaust system heat exchanger (the lowermost portion thereof) of the present invention, refers to the portion thereof in which heat exchange is carried out between exhaust gas and a cooling medium (the lowermost portion thereof), and other components and the like appended thereto may project in the vehicle up-down direction below the vehicle body frame.

In the above described aspect the vehicle body frame may be configured to include a first member that is positioned in the vehicle up-down direction below one end side in the longitudinal direction of the exhaust system heat exchanger, and a second member that is positioned in the vehicle up-down direction below the other end side in the longitudinal direction of the exhaust system heat exchanger.

By the above aspect, the first referred to end in the longitudinal direction of the exhaust system heat exchanger is protected from road surface interference by the first member, and also the other end in the longitudinal direction of the exhaust system heat exchanger is protected from road surface interference by the second member. Due to this, interference to the exhaust system heat exchanger by the road surface or the like may be effectively prevented.

In the above aspect: the longitudinal direction of the exhaust system heat exchanger may be along substantially the vehicle front-rear direction; the first member may be disposed in the vehicle front-rear direction to the front of the second member; and the lowermost portion of the first member in the vehicle up-down direction may be positioned in the vehicle up-down direction above the lowermost portion of the second member in the vehicle up-down direction.

By the above aspect, the second member of the first and second members is positioned relatively toward the rear in the vehicle front-rear direction, but since the second member projects in the vehicle up-down direction below the first member, the flow direction of a portion of the running wind that flows under the vehicle body floor is guided to the exhaust system heat exchanger side by the second member. By so doing, for example, overheating of the cooling medium of the exhaust system heat exchanger may be prevented.

In the above aspect: the longitudinal direction of the exhaust system heat exchanger may be along substantially the vehicle front-rear direction and the exhaust system heat exchanger may be disposed in a floor tunnel provided to the vehicle body floor; and the vehicle body frame may include a pair of tunnel side reinforcements, the longitudinal direction of each of the tunnel side reinforcements being substantially along the vehicle front-rear direction, and the pair of tunnel side reinforcements being provided so as to project from edge portions at both sides in the vehicle width direction of an opening that faces down in the vehicle up-down direction of the floor panel in the vehicle body floor, below the exhaust system heat exchanger in the vehicle up-down direction.

By the above aspect, tunnel side reinforcements are disposed along the edges of a downward facing opening of the floor tunnel at the outside face of the vehicle body floor (the bottom face in the vehicle up-down direction), bottom edges in the vehicle up-down direction of the tunnel side reinforcements project in the vehicle up-down direction below the lowermost portion of the exhaust system heat exchanger disposed in the floor tunnel. That is to say, each portion in the longitudinal direction of the exhaust system heat exchanger is effectively prevented from road surface interference by these tunnel side reinforcements.

A vehicle body mounting structure for an exhaust system heat exchanger of a second aspect of the present invention includes: an exhaust system heat exchanger that is disposed at the bottom side of a vehicle body floor, with the longitudinal direction of the exhaust system heat exchanger being substantially along the vehicle front-rear direction, the exhaust system heat exchanger carrying out heat exchange between exhaust gas and a cooling medium; a first member that is positioned in the vehicle up-down direction below the front end side in the longitudinal direction of the exhaust system heat exchanger; and a second member that is positioned in the vehicle up-down direction below the rear end side in the longitudinal direction of the exhaust system heat exchanger, the lowermost portion of the second member in the vehicle up-down direction being positioned in the vehicle up-down direction below the lowermost portion of the first member in the vehicle up-down direction.

By the above aspect, since the second member projects in the vehicle up-down direction below the first member positioned at the front side in the vehicle front-rear direction of the second member, a portion of the running wind that flows under the vehicle body floor is guided (the flow direction is changed) to the exhaust system heat exchanger side by the second member. By so doing, for example, over heating of the cooling medium of the exhaust system heat exchanger may be prevented.

In the above aspect, the topside face in the vehicle up-down direction of the first member may include an inclined angled face, positioned such that the rear side of the angled face in the vehicle front-rear direction is above the front side of the angled face in the vehicle up-down direction.

By the above aspect, a portion of the running wind that flows under the vehicle body floor is guided (the flow direction is changed) to the exhaust system heat exchanger side by the angled face of the first member. By so doing, for example, over heating of the cooling medium of the exhaust system heat exchanger may be effectively prevented.

A vehicle body mounting structure for an exhaust system heat exchanger of a third aspect of the present invention includes: an exhaust system heat exchanger that is disposed at the bottom side of a vehicle body floor with the longitudinal direction of the exhaust system heat exchanger being substantially along the vehicle front-rear direction, the exhaust system heat exchanger carrying out heat exchange between exhaust gas and a cooling medium; and a vehicle body frame member that is disposed in the vehicle up-down direction below the front end side of the exhaust system heat exchanger, the vehicle body frame member having an angled face inclined so as to face up in the vehicle up-down direction and face forward in the vehicle front-rear direction.

By the above aspect, a portion of the running wind that flows under the vehicle body floor is guided (the flow direction is changed) to the exhaust system heat exchanger side by the angled face of the vehicle body frame member. By so doing, for example, over heating of the cooling medium of the exhaust system heat exchanger may be effectively prevented.

In the above aspect, the longitudinal direction of the exhaust system heat exchanger may be substantially along the vehicle front-rear direction and the exhaust system heat exchanger may be disposed such that the front side in the vehicle front-rear direction of the exhaust system heat exchanger is positioned in the vehicle up-down direction above the rear side of the exhaust system heat exchanger.

By the above aspect, the exhaust system heat exchanger is supported at an inclination so that the bottom of the exhaust system heat exchanger faces to the front in the vehicle front-rear direction. Due to this, interference (snagging) from obstacles on the road surface and the like to the front end side in the vehicle front-rear direction of the exhaust system heat exchanger may be prevented.

In the above aspect, the exhaust system heat exchanger comprises a flow path provided such that cooling liquid that is the cooling medium flows through, and a gas release portion being communicated to the top side in the vehicle up-down direction of the uppermost portion in the vehicle up-down direction of the flow path of the cooling liquid.

Gas bubbles may be generated when, for example, circulation of the cooling liquid is stopped along with the shut-down of the engine exhausting the exhaust gas and the cooling liquid boils due to the remaining heat of the exhaust system heat exchanger. By the above aspect, these gas bubbles collect in the gas release portion communicating with the uppermost portion in the cooling liquid flow path of the exhaust system heat exchanger, or are exhausted via the gas release portion, and accumulation of gas bubbles within the exhaust system heat exchanger may be suppressed.

A vehicle body mounting structure for an exhaust system heat exchanger of a fourth aspect of the present invention includes: an exhaust system heat exchanger that is disposed at an inclination such that one end side in the longitudinal direction of the exhaust system heat exchanger is positioned in the vehicle up-down direction above the other end side of the exhaust system heat exchanger, and the exhaust system heat exchanger carries out heat exchange between exhaust gas and a cooling liquid; and a gas release portion provided communicated to the top side in the vehicle up-down direction of the uppermost portion in the vehicle up-down direction of the flow path of the cooling liquid of the exhaust system heat exchanger.

Gas bubbles may be generated when, for example, circulation of the cooling liquid is stopped along with the shut-down of the engine exhausting the exhaust gas and the cooling liquid boils due to the remaining heat of the exhaust system heat exchanger. By the above aspect, these gas bubbles collect in the gas release portion communicating with the uppermost portion in the cooling liquid flow path of the exhaust system heat exchanger, or are exhausted via the gas release portion, and accumulation of gas bubbles within the exhaust system heat exchanger may be suppressed.

In the above aspect, the gas release portion may be a cooling liquid inlet portion or a cooling liquid outlet portion of the cooling liquid flow path in the exhaust system heat exchanger.

By the above aspect, there is a gas release portion provided to one or other, or both, of a cooling liquid inlet portion and/or a cooling liquid outlet portion at the uppermost portion of the cooling liquid flow path in the exhaust system heat exchanger that is supported at an inclination to the vehicle body, and any gas bubbles that are generated in the cooling liquid flow path are exhausted from the inlet portion or the outlet portion.

In the above aspect, a shell forming the external profile of the exhaust system heat exchanger may be configured as an outer wall to the cooling liquid flow path, and the gas release portion may be provided to the uppermost portion in the vehicle up-down direction of the shell.

By the above aspect, since the cooling liquid flow path configures the outermost layer of the exhaust system heat exchanger, or in other words, since the cooling liquid is able to exchange heat to the atmosphere through the shell (atmospheric cooling), generation of gas bubbles due to boiling may be suppressed. Furthermore, since the gas release portion is provided to the shell, the structure is simplified.

EFFECT OF THE INVENTION

As may be seen from the above explanation of the vehicle body mounting structure for an exhaust system heat exchanger of the present invention achieves the superior effect of enabling good protection of an exhaust system heat exchanger disposed below a vehicle body floor.

BRIEF DESCRIPTION OF THE DRAWINGS

Exemplary embodiments of the present invention will be described in detail based on the following figures, wherein:

FIG. 9A is a bottom view showing an exhaust gas system of an exhaust system mounting structure according to an exemplary embodiment of the present invention;

FIG. 9B is a side view showing an exhaust system mounting structure according to an exemplary embodiment of the present invention;

DETAILED DESCRIPTION OF THE INVENTION

Figure 1:
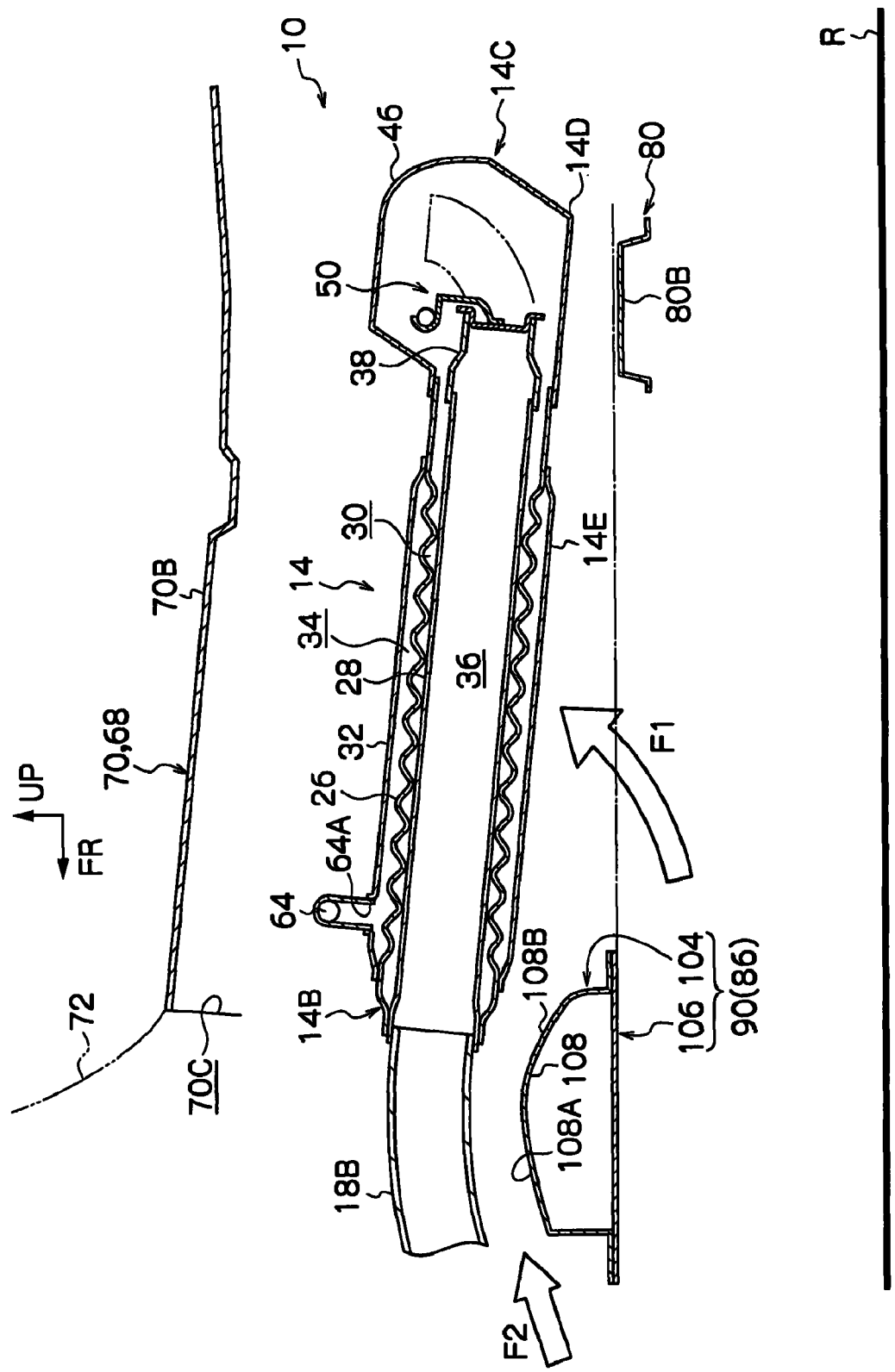
FIG. 1 is a lateral cross-section showing relevant portions of an exhaust system mounting structure according to an exemplary embodiment of the present invention.

Herebelow, an example of an exemplary embodiment of the present invention will be described in detail with reference to the drawings.

Explanation will now be given of a vehicle exhaust system mounting structure 10 to which the vehicle body mounting structure of an exhaust system heat exchanger according to an exemplary embodiment of the present invention has been applied, with reference to FIG. 1 to FIG. 10. Explanation will be given below, in sequence, of the outline overall configuration of the exhaust gas system of the vehicle exhaust system mounting structure 10, the configuration of a heat exchanger, the outline overall configuration of a vehicle body B to which the vehicle exhaust system mounting structure 10 is mounted, and the mounting structure (mounting form) of an exhaust system heat exchanger 14 for the vehicle body B. It is to be noted that in the explanation below, when simply the words upstream and downstream are used, this refers to the exhaust gas flow direction upstream and downstream. Also, in each of the figures the arrow FR, arrow UP, and the arrow W indicate, respectively, the front side in the vehicle front-rear direction (forward direction) of a vehicle to which the vehicle exhaust system mounting structure 10 has been applied, the upper side in the vehicle up-down direction, and the vehicle width direction.

(Outline Overall Configuration of the Exhaust Gas System)

In FIG. 9A an outline overall configuration of the vehicle exhaust system mounting structure 10 is shown in bottom view, and in FIG. 9B the vehicle exhaust system mounting structure 10 is shown in side view. As may be seen from these figures, the vehicle exhaust system mounting structure 10 is provided with, in sequence from upstream to downstream: a catalytic convertor 12, for cleaning exhaust gas; an exhaust system heat exchanger 14, for assisting engine warm-up and heat conservation, which recovers heat from the exhaust gas; and a muffler 16, for reducing the noise of the exhaust (silencing). These components are communicated with each other in series with an exhaust pipe 18.

The downstream end of the exhaust pipe 18A is connected to the upstream end of the catalytic convertor 12, and the upstream end of the exhaust pipe 18A is connected to the exhaust manifold of an internal combustion engine, not illustrated in the figure, in such a manner that exhaust gas from the internal combustion engine is introduced therein. Also, both the catalytic convertor 12 and the exhaust system heat exchanger 14 both have their longitudinal directions substantially in the vehicle front-rear direction, and they are connected together in substantially a straight line, when seen in plan view, by an exhaust pipe 18B. In this exemplary embodiment, the exhaust pipe 18A, the catalytic convertor 12, the exhaust pipe 18B and the exhaust system heat exchanger 14 are disposed substantially in a straight line when seen in plan view. However, the upstream end of an exhaust pipe 18C, serving as an exhaust gas outflow pipe portion, which has been connected to the downstream end of the exhaust system heat exchanger 14, is disposed at an angle to the vehicle front-rear direction when seen in plan view. By so doing, the vehicle exhaust system mounting structure 10, for example, avoids a non illustrated fuel tank that might be located to the rear of the exhaust system heat exchanger 14. Details of the configuration of the exhaust pipe 18C will be discussed later.

The longitudinal direction of the muffler 16 is substantially that of the vehicle front-rear direction, and the muffler 16 is disposed, for example, parallel to the above described fuel tank and vehicle width direction. The downstream end of the exhaust pipe 18C is connected to the upstream end of a muffler inlet pipe 22. An upstream portion 22A of the muffler inlet pipe 22 is angled to the vehicle front-rear direction so that it forms substantially a right angle to the exhaust pipe 18C. A downstream portion 22B of the muffler inlet pipe 22 is disposed mainly within the muffler 16, and the longitudinal direction thereof is in the vehicle front-rear direction. A central portion 22C of the muffler inlet pipe 22 is bent around so as to be continuous to the above described upstream portion 22A and downstream portion 22B. Furthermore, a muffler outlet pipe 24 that has an upstream portion 24A disposed within the muffler 16, is integrated to an exhaust pipe 18E that has an exhaust gas atmosphere release portion 18D at the downstream end thereof.

A layout of the vehicle exhaust system mounting structure 10 such as the one explained above is applicable, for example, to a small, front engine, front wheel drive (FF) vehicle.

(Structure of the Exhaust System Heat Exchanger)

The exhaust system heat exchanger 14 is configured to recover heat from the exhaust gas to engine cooling water, serving as a cooling medium or a cooling liquid. As may be seen from FIG. 10, the exhaust system heat exchanger 14 is provided with a partition wall pipe 26 that partitions the flow path of the exhaust gas from the flow path of the engine cooling water. In this exemplary embodiment, there are spiral grooves 26A, 26B formed in a spiral shape on the internal and external pipe walls of the partition wall pipe 26. The spiral groove 26A and the spiral groove 26B are formed over substantially the entire length of a heat exchange portion 14A in which heat exchange is carried out between the exhaust gas and the engine cooling water. At the front and rear ends of the partition wall pipe 26 there are an exhaust gas introduction portion 26C and an exhaust gas exhaust portion 26D that extend, respectively, to the front and to the rear of the heat exchange portion 14A.

There is an inner pipe 28 formed in a substantially cylindrical tubular shape and disposed coaxially inside of the partition wall pipe 26. The space formed between the partition wall pipe 26 and the inner pipe 28 is the exhaust gas flow path 30 of the exhaust system heat exchanger 14. Furthermore, the partition wall pipe 26 is covered at the outer circumferential side thereof by an outer pipe 32 that is formed in a substantially cylindrical tubular shape and disposed coaxially to the partition wall pipe 26. The space between the partition wall pipe 26 and the outer pipe 32 is the engine cooling water flow path 34 of the exhaust system heat exchanger 14.

The region in the exhaust system heat exchanger 14 in the exhaust gas flow path that is formed by the engine cooling water flow path 34 is the heat exchange portion 14A in which heat exchange between the exhaust gas and the engine cooling water is carried out, and the inner pipe 28 projects out to the upstream side and to the downstream side of the heat exchange portion 14A. The space in the inner pipe 28 in the exhaust system heat exchanger 14 is a bypass flow path 36 for bypassing the heat exchange portion 14A in the exhaust system heat exchanger 14.

Figure 10:
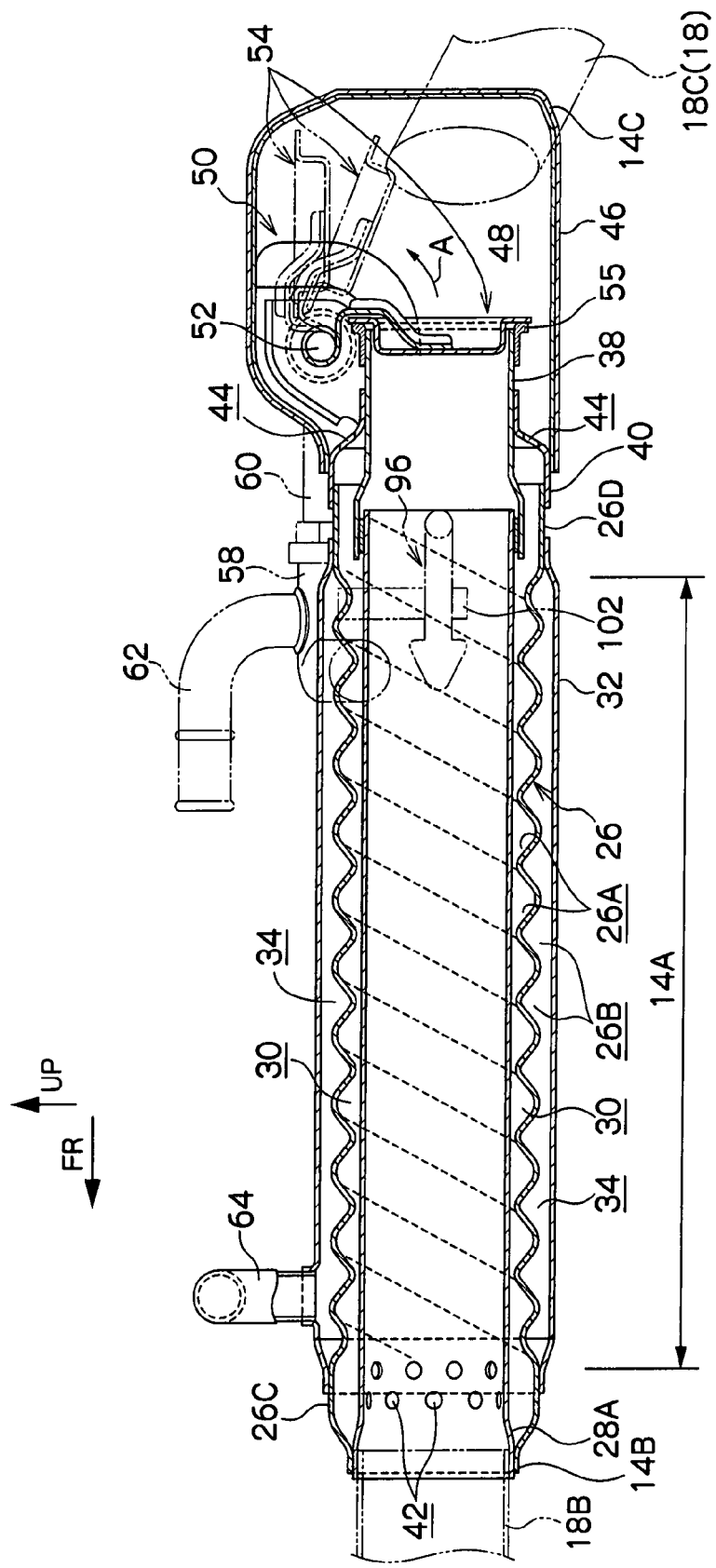
FIG. 10 is a lateral cross-section of an exhaust system heat exchanger included in an exhaust system mounting structure according to an exemplary embodiment of the present invention.

More specifically, as shown in FIG. 10, an upstream end 28A of the inner pipe 28 is connected to the downstream end of the exhaust pipe 18B, and a downstream end 28B of the inner pipe 28 is connected substantially coaxially to an upstream end 38A of an exhaust gas guide pipe 38. It is to be noted that in place of the exhaust gas guide pipe 38, the downstream side of the inner pipe 28 may be extended. Furthermore, in the partition wall pipe 26, the portion that protrudes out to the upstream side of the outer pipe 32 (from the engine cooling water flow path 34) (a portion that is upstream of the heat exchange portion 14A) is the exhaust gas introduction portion 26C. The front end of this exhaust gas introduction portion 26C is connected in a hermetically sealed state to the outer circumferential surface of the upstream end 28A of the inner pipe 28. Furthermore, in the partition wall pipe 26, the portion that protrudes out to the downstream from the outer pipe 32 (from the engine cooling water flow path 34) (a portion to the downstream of the heat exchange portion 14A) is the exhaust gas exhaust portion 26D. The exhaust gas exhaust portion 26D is connected in a hermetically sealed state to exhaust gas guide pipe 38 via an end pipe 40.

The portion in the inner pipe 28 that is inside of the exhaust gas introduction portion 26C of the partition wall pipe 26 is provided with through holes 42 that communicate the bypass flow path 36 and the exhaust gas flow path 30. That is to say, the through holes 42 configure a branch portion between the exhaust gas flow path 30 (heat exchange portion 14A) and the bypass flow path 36. Also, there are through holes 44 provided in the end pipe 40 that communicate the inside and the outside of the exhaust gas flow path 30. The through holes 44 and a downstream opening end 38B of the exhaust gas guide pipe 38 are, respectively, openings (interflows) to an exhaust gas exit header 48. The exhaust gas exit header 48 forms a space inside an exhaust system heat exchanger rear portion shell 46 that is connected by the upstream opening end thereof to the end pipe 40 in a hermetically sealed state.

Therefore it is configured such that, in the exhaust system heat exchanger 14, the exhaust gas that passes through the heat exchange portion 14A via the bypass flow path 36, passes via the inside of the exhaust gas guide pipe 38 to the exhaust gas exit header 48 at the inside of the exhaust system heat exchanger rear portion shell 46. However, it is configured such that the exhaust gas that passes through the exhaust gas flow path 30 via the through holes 42, passes by the outside of the exhaust gas guide pipe 38, through the through holes 44 to the exhaust gas exit header 48 at the inside of the exhaust system heat exchanger rear portion shell 46.

Furthermore, there is a valve device 50 provided in the exhaust system heat exchanger 14 for opening and closing the downstream opening end 38B of the exhaust gas guide pipe 38. The valve device 50 is provided with a valve 54 that is able to adopt, by rotational movement around a rotational shaft 52 that is supported by the exhaust system heat exchanger rear portion shell 46: a closed position in which the downstream opening end 38B of the exhaust gas guide pipe 38 is closed off (see the solid lines of FIG. 10); and an open position in which the downstream opening end 38B of the exhaust gas guide pipe 38 is opened up (see the two-dot chain lines of FIG. 10). The valve 54 placed in the closed position is configured so as to abut a valve seat (seal) 55 that is provided around the downstream opening end 38B in the exhaust gas guide pipe 38.

Furthermore, the valve device 50 is provided with a return spring 56 that imparts a biasing force to the rotational shaft 52 in order to bias the valve 54 to the closed position. By doing so, in the exhaust system heat exchanger 14, when the pressure of the exhaust gas is low, the valve 54 closes off the exhaust gas guide pipe 38, that is to say the flow path 36, due to the biasing force of the return spring 56, and exhaust gas passes through the exhaust gas flow path 30 of the heat exchange portion 14A. However, when the pressure of the exhaust gas is equal to a predetermined value or greater, the valve 54 adopts, against the biasing force of the return spring 56, an open position according to the pressure of the exhaust gas. In this exemplary embodiment, the valve 54 is set so as to adopt an open position that has the maximum degree of opening at the pressure of the exhaust gas when the maximum output is generated from the internal combustion engine described above.

Furthermore, in this exemplary embodiment, the valve device 50 is configured such that when the temperature of the engine cooling water carrying out heat exchange with the exhaust gas is at a predetermined temperature or above, the valve 54 is mandatorily retained in the open position, independent of the pressure of the exhaust gas. Specifically, first cooling water inlet pipe 58, the inside of which being communicated with the engine cooling water flow path 34, is connected to the outer pipe 32 at the downstream side thereof in the direction of exhaust gas flow. There is a thermo-actuator 60 disposed at an end portion of the first cooling water inlet pipe 58, and, by the thermal expansion of wax that has been filled inside the thermo-actuator 60, the thermo-actuator 60 presses a non illustrated lever that projects out in a radial direction from the rotational shaft 52, against the biasing force of the return spring 56, and thereby rotates the valve 54 toward the open position. In this exemplary embodiment, when the temperature of the engine cooling water is 80° C. or greater, the thermo-actuator 60 is configured so as to open the valve 54 to the fully open position (see the single-dot chain line in FIG. 10) that is more open than the above describe open position due to the pressure of the exhaust gas.

As shown in FIG. 10, there is a second cooling water inlet pipe 62 connected, via the first cooling water inlet pipe 58, to the engine cooling water flow path 34 of the exhaust system heat exchanger 14 for introducing engine cooling water thereto. Also, there is a cooling water outlet pipe 64 connected at the upstream side in the exhaust gas flow direction in the outer pipe 32, for letting out engine cooling water from the engine cooling water flow path 34. The cooling water outlet pipe 64 is communicated with approximately the top portion in the up-down direction of the outer pipe 32 (the uppermost portion in the mounting position to the vehicle body B described later). The second cooling water inlet pipe 62 is disposed at the uppermost portion of the first cooling water inlet pipe 58, which has itself been communicated just slightly below the top portion in the up-down direction of the outer pipe 32, and the second cooling water inlet pipe 62 communicates with a portion of the first cooling water inlet pipe 58 that is higher than the uppermost portion of the outer pipe 32. The second cooling water inlet pipe 62 and the cooling water outlet pipe 64 are connected to the cooling water circulation path that includes the internal combustion engine, radiator, heater core, so as to be in series to at least the internal combustion engine along the engine cooling water flow.

Due to the above, the exhaust system heat exchanger 14 is an counter flow type exhaust system heat exchanger in which the direction of flow of the exhaust gas is the opposite direction to the direction of flow of the engine cooling water. In this exemplary embodiment there is compact and highly efficient heat exchange undertaken in the exhaust system heat exchanger 14 due to a configuration in which the exhaust gas develops a spiral shaped flow along the spiral groove 26A, and also, the engine cooling water develops a spiral shaped flow in the opposite direction to that of the gas along the spiral groove 26B. Furthermore, the exhaust system heat exchanger 14 is configured such that the pressure loss (back pressure) of the exhaust gas on passing through the bypass flow path 36 is sufficiently small relative to the pressure loss due to the exhaust gas passing through the exhaust gas flow path 30, and so when the valve 54 is in an open position most of the exhaust gas passes through the bypass flow path 36.

(Vehicle Body Structure)

Figure 2:
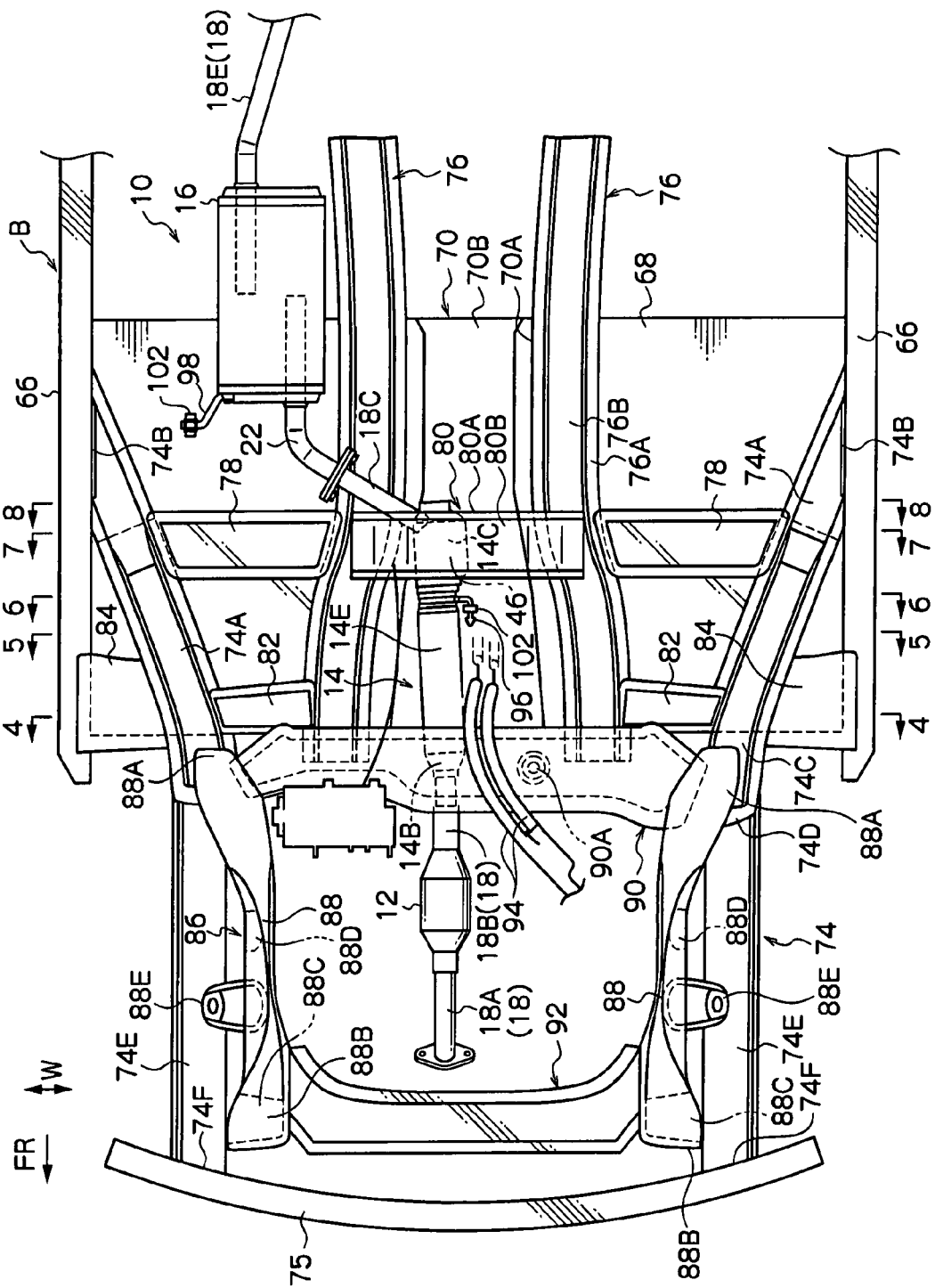
FIG. 2 is a bottom view showing an exhaust system mounting structure according to an exemplary embodiment of the present invention.
Figure 3:
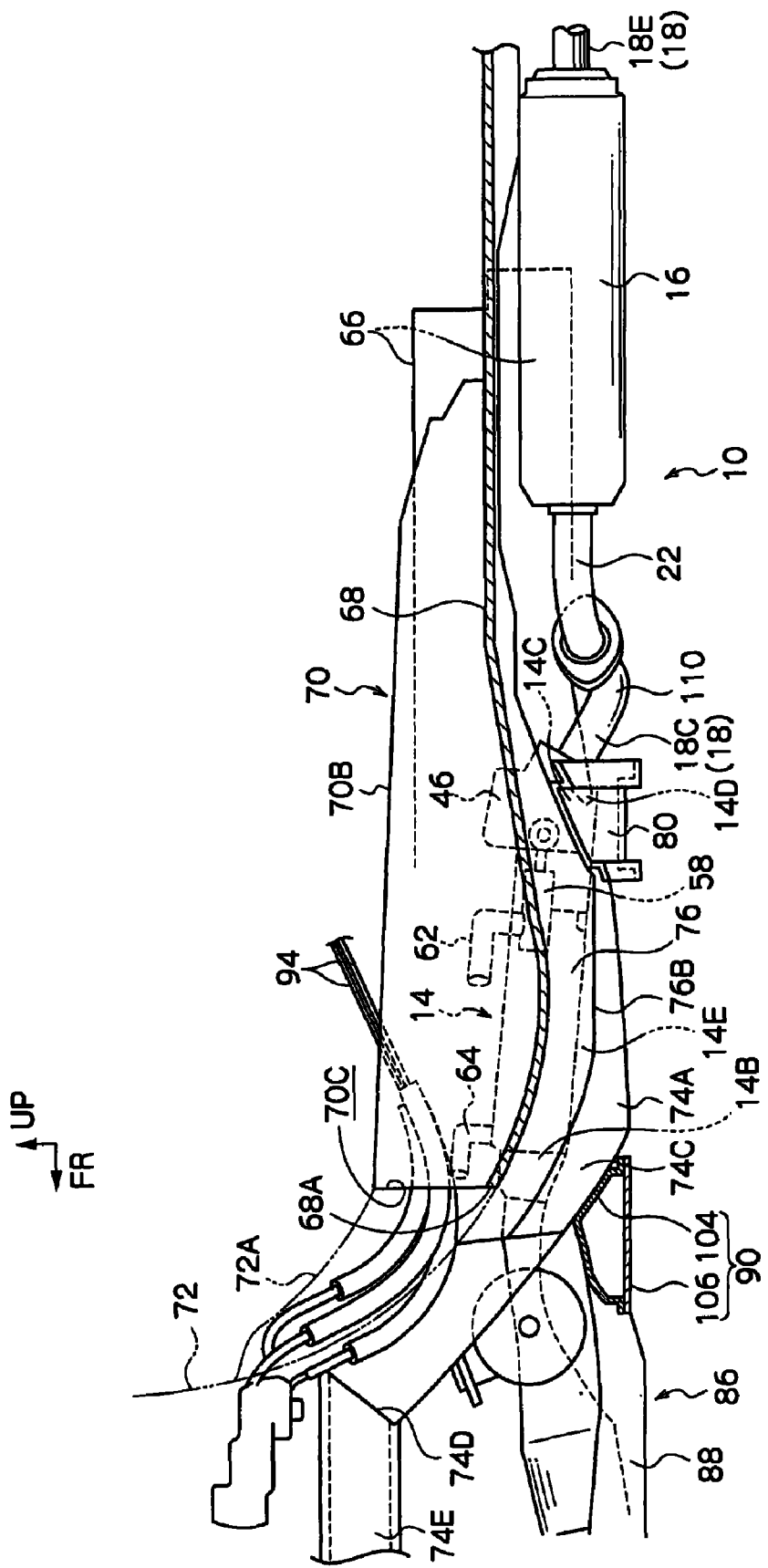
FIG. 3 is a side view showing a vehicle exhaust system structure according to an exemplary embodiment of the present invention.

In FIG. 2 the front structure of a vehicle body B is shown in bottom view, and in FIG. 3 the front structure of a vehicle body B is shown in side view. As may be seen from these figures, the vehicle body B is provided with a pair of, left and right, rockers 66 that have respective longitudinal directions that are in the vehicle front-rear direction. The left and right rockers 66 configure the frame of outermost portions in the vehicle width direction. Different end portions in the vehicle width direction of a front floor panel 68 are welded to the left and right rockers 66, respectively. There is a floor tunnel 70 formed to a central portion in the vehicle width direction of the front floor panel 68, and the floor tunnel 70 is open toward the bottom in the vehicle up-down direction. The floor tunnel 70 is open toward the front of the vehicle body front-rear direction, and as shown in FIG. 3, the floor tunnel 70 is continuous to a tunnel portion 72A that is formed at a dash panel 72 that has been welded to the front end 68A of the front floor panel 68.

Furthermore, in the front floor panel 68, there are rear portions 74A of front side members 74, which form the frame of the front portion of the vehicle body, welded to the bottom face between the floor tunnel 70 and the left and right rockers 66. The rear portions 74A of the front side member 74 are formed into a hat shape in cross section that is open toward the top, and the rear portions 74A are welded to the front floor panel 68 to form closed cross-sections. The rear end 74B side in the vehicle front-rear direction of the rear portions 74A of the front side member 74 are angled (curved) so as to the positioned to the outside in the vehicle width direction, and the rear ends 74B are welded (continuous) to the left and right rockers 66. The front side members 74 have kick portions 74C that are respectively continuous to the front side of the rear portions 74A and are welded to the bottom surface of the dash panel 72. A front portion 74E is continuous to each of the front ends 74D of the kick portions 74C of the front side members 74 so as to form independent closed cross-sections. There is a front bumper reinforcement 75, configuring a front bumper, spanning across between the front ends 74F of the front portions 74E.

Furthermore, as shown in FIG. 2, tunnel side reinforcements 76 are provided, respectively, in the vicinity of the outside in the vehicle width direction of open ends 70A of the floor tunnel 70, the tunnel side reinforcements 76 having longitudinal directions that are in the vehicle front-rear direction. Each of the tunnel side reinforcements 76, as shown in FIG. 4 to FIG. 8, have cross-sections that are open to the top in the vehicle up-down direction. Flanges 76A extend from the opening end of each of the tunnel side reinforcements 76, and the flanges 76A are welded to the bottom face of the front floor panel 68 and the side faces of the floor tunnel 70, respectively, so as to form a closed cross-section framework structure. There are floor cross-members 78 spanning across between the respective tunnel side reinforcements 76 and the rear portions 74A of the front side members 74 that are on the same side relative to the center in the vehicle width direction of the vehicle body B. Each of the floor cross-members 78 is respectively welded to the bottom face of the front floor panel 68, thereby forming a closed cross-section framework structure that is long in the vehicle width direction.

Figure 7:
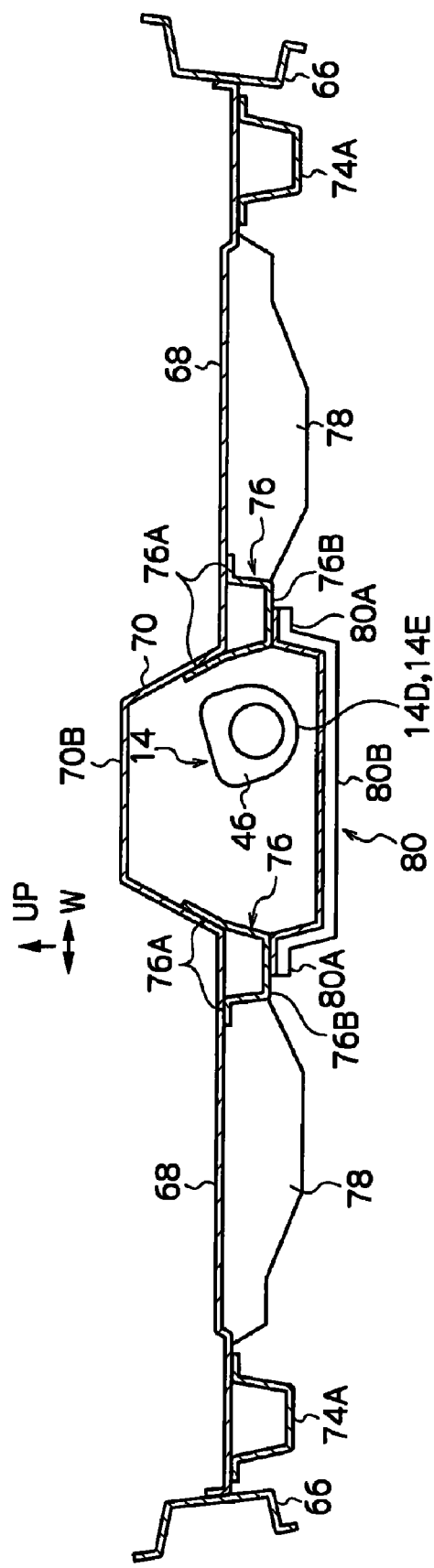
FIG. 7 is a cross-section taken on 7-7 of FIG. 2.
Figure 8:
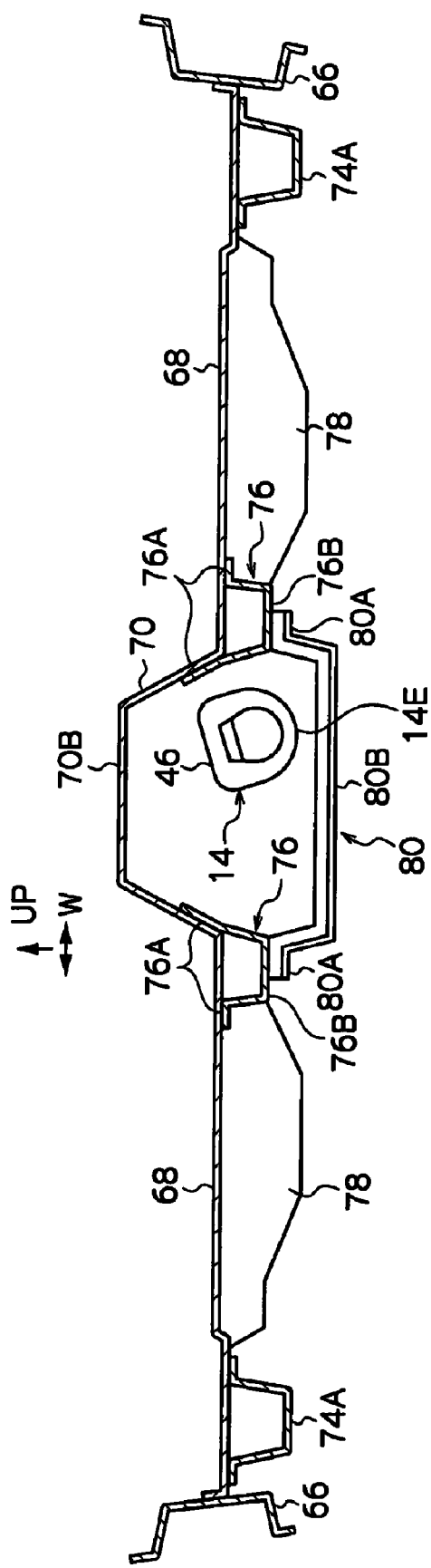
FIG. 8 is a cross-section taken on 8-8 of FIG. 2.

Also, as shown in FIG. 2 and FIG. 3, at the left and right tunnel side reinforcements 76 there are the left and right floor cross-members 78 that are long in the vehicle width direction and that are located in the same position in the vehicle front-rear direction as a body cross-member 80 that spans across between the tunnel side reinforcements 76. As shown in FIG. 7 and FIG. 8, the body cross-member 80 has a substantially hat shaped cross-section that is open to the bottom in the vehicle up-down direction, and that is formed so as overall to have a hat shape that is open to the top in the vehicle up-down direction when viewed from the front face thereof. A pair of, left and right, flanges 80A project out in the vehicle width direction from the edges of the top facing opening of the body cross-member 80, and the flanges 80A are welded to bottom faces 76B of the tunnel side reinforcements 76. Due to this, a cross portion 80B (the top face thereof) of the body cross-member 80 that traverses below the floor tunnel 70 in the vehicle up-down direction is positioned lower than the bottom faces 76B of the tunnel side reinforcements 76 in the vehicle up-down direction.

It should be noted that the rear portion 74A of the front side member 74 and the tunnel side reinforcement 76 that is positioned on the same side of the vehicle body B in the vehicle width direction, are spanned across by a cross-member 82 that is disposed along the front end 68A of the front floor panel 68. Furthermore, the rear portion 74A of the front side member 74 and the left and right rocker 66 that is positioned on the same side of the vehicle body B in the vehicle width direction, are spanned across by a cross-member 84 that is disposed along the front end 68A of the front floor panel 68.

Also, as shown in FIG. 2, there is a sub-frame (suspension member) 86 provided to the vehicle body B and disposed at the front of the front floor panel 68. The sub-frame 86 is formed so as to be a substantially rectangular frame shape in plan view, and has: a pair of, left and right, side rails 88 that are long in the vehicle front-rear direction, the respective rear ends 88A thereof being fixed to the kick portion 74C of the front side member 74 that is positioned on the same side relative to the vehicle width direction center; an engine rear mount support member (rear cross-member) 90 that is long in the vehicle width direction and spans across between the rear ends 88A of the left and right pair of side rails 88; and a front cross-member 92 that is long in the vehicle width direction and spans across between front ends 88B of the left and right pair of side rails 88.

In this exemplary embodiment there is a non illustrated internal combustion engine that exhausts the above described exhaust gas, and front suspensions for supporting left and right front wheels, and the like mounted to the sub-frame 86. To be more specific, there is a rear mount support portion 90A provided to the engine rear mount support member 90, to which a non illustrated engine mount is fixed, for supporting the rear portion of the internal combustion engine. Furthermore, there is a pair of, front and rear, lower arm support portions 88C, 88D, for supporting lower arms that configure the front suspension, formed at the respective left and right pair of side rails 88. Furthermore, there is a side member connection portion 88E provided between each of the lower arm support portions 88C, 88D of the left and right pair of side rails 88 and connected to the front portion 74E of the front side members 74.

The engine rear mount support member 90 of the subframe 86 as explained above is, as shown in FIG. 1, positioned above the cross portion 80B of the body cross-member 80 in the vehicle up-down direction.

Furthermore, the vehicle body B is partitioned by the dash panel 72 into an engine room E in which a non illustrated transmission is disposed, and a vehicle cabin C in which a non illustrated shift lever device is disposed. The variable transmission and the shift lever device are operationally coupled together by a shift cable 94. The shift cable 94 passes from the engine room E, through the floor tunnel 70, through a top wall 70B of the floor tunnel 70 and into the vehicle cabin C.

(Exhaust System Heat Exchanger Mounting Structure)

As shown in FIG. 2, in the vehicle exhaust system mounting structure 10, the exhaust pipe 18A and the catalytic convertor 12 are disposed in the engine room E, and as shown in FIG. 3, the exhaust pipe 18B passes through a front facing open end 70C of the floor tunnel 70 into the floor tunnel 70. The above described exhaust system heat exchanger 14 that is long in the vehicle front-rear direction is provided so as to be disposed in the floor tunnel 70. Also, the muffler 16 is positioned to the outside in the vehicle width direction relative to one of the tunnel side reinforcements 76, and the exhaust pipe 18C cuts across the tunnel side reinforcements 76, when viewed from the bottom.

In the vehicle exhaust system mounting structure 10, the exhaust system as a whole is supported in the vehicle body B by support rods 96, 98, 100 shown in FIG. 9A and FIG. 9B. In this exemplary embodiment, the support rod 96 is fixed by welding to the exhaust gas exhaust portion 26D of the partition wall pipe 26 configuring the exhaust system heat exchanger 14, the support rod 98 is fixed by welding to a front end portion 16A of the muffler 16, and the support rod 100 is fixed by welding to a rear portion of the exhaust pipe 18E. These support rods 96, 98, 100 are inserted into support rubbers 102 that have been inserted into by support rods (omitted in the figures) on the respective vehicle body sides thereof, and thereby the support rods 96, 98, 100 are supported elastically with respect to the vehicle body B. It is configured such that the center of mass G of the vehicle exhaust system mounting structure 10 is within a triangle T, shown in phantom lines that connect the support positions of the support rods 96, 98, 100 by the support rubbers 102.

Also, as shown in FIG. 1, the exhaust system heat exchanger 14 is inclined at an angle to the horizontal (declining to the rear) so that a front end 14B thereof is located in the vehicle up-down direction above a rear end 14C (the exhaust system heat exchanger rear portion shell 46 side) thereof. Furthermore, the front end 14B of the exhaust system heat exchanger 14 is positioned in the vehicle up-down direction above the engine rear mount support member 90 that is a first member, or a vehicle body frame. The rear end 14C is positioned in the vehicle up-down direction above the body cross-member 80 that is a second member, or a vehicle body frame.

To be more specific, as shown in FIG. 1, the engine rear mount support member 90 has a closed cross-section structure with a lower member 106 connected between flanges of an upper member 104 that is formed in a hat shape cross-section that is open downward. An upper wall 108 of the engine rear mount support member 90 has: a front angled surface 108A that is angled so as to face the top side in the vehicle up-down direction and to face the front side in the vehicle front-rear direction; and a rear angled surface 108B that is contiguous to the rear of front angled surface 108A and is angled so as to face the top side in the vehicle up-down direction and to face the rear side in the vehicle front-rear direction. The front end 14B of the exhaust system heat exchanger 14 is positioned mainly above the rear angled surface 108B of the engine rear mount support member 90.

Furthermore, the exhaust system heat exchanger rear portion shell 46 that configures the rear end 14C of the exhaust system heat exchanger 14 is disposed directly above and separated from (not in contact with) the body cross-member 80. Therefore, a lowermost portion 14D of the rear end 14C, which is the lowermost portion of the exhaust system heat exchanger 14, is positioned in the vehicle up-down direction above the body cross-member 80. Furthermore, the exhaust pipe 18B that is positioned to the front in the vehicle front-rear direction of the exhaust system heat exchanger 14, passes through in the vehicle up-down direction above the front angled surface 108A of the engine rear mount support member 90, and the exhaust pipe 18B is separated from the front angled surface 108A (not in contact therewith).

Figure 4:
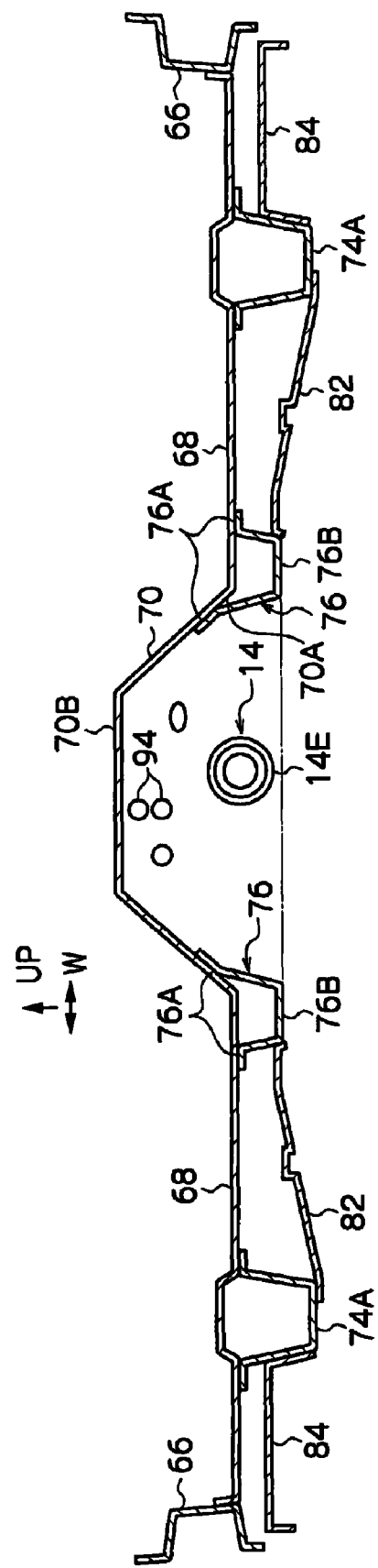
FIG. 4 is a cross-section taken on 4-4 of FIG. 2.
Figure 5:
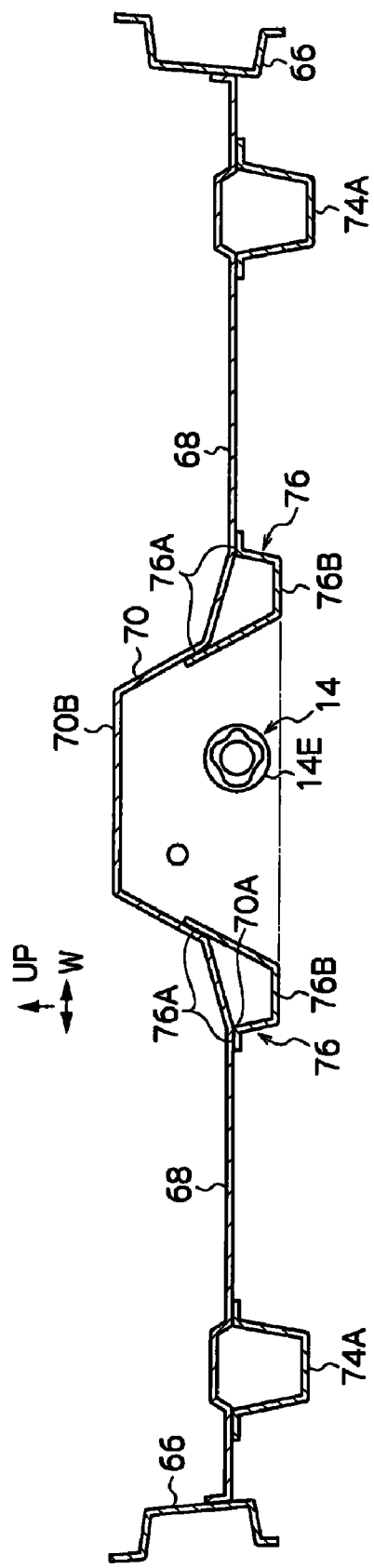
FIG. 5 is a cross-section taken on 5-5 of FIG. 2.
Figure 6:
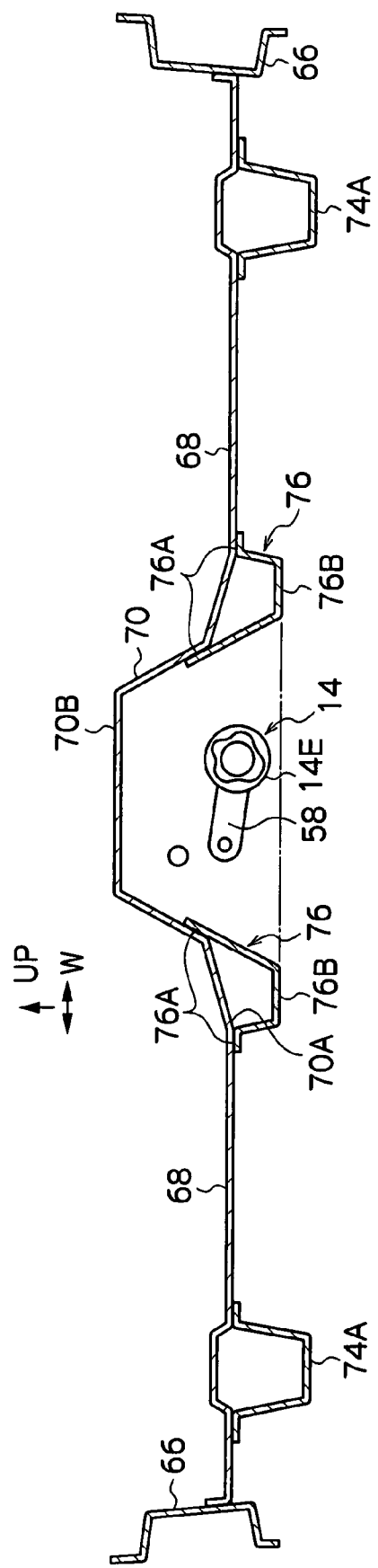
FIG. 6 is a cross-section taken on 6-6 of FIG. 2.

Also, in the vehicle exhaust system mounting structure 10, as shown in FIG. 3, between the engine rear mount support member 90 and the body cross-member 80, the exhaust system heat exchanger 14 is positioned above the bottom faces 76B of the tunnel side reinforcements 76. That is to say, as shown in FIG. 4 and FIG. 8, between the engine rear mount support member 90 and the body cross-member 80, the left and right tunnel side reinforcements 76 project in the vehicle up-down direction below lowermost portions 14E, which are the lowermost portion of each of the positions in the longitudinal direction of the exhaust system heat exchanger 14. By doing such, the exhaust system heat exchanger 14 is surrounded, from the front, rear, left and right, by the vehicle body frame that projects out in the vehicle up-down direction below the exhaust system heat exchanger 14.

In particular, in the vehicle exhaust system mounting structure 10, the heat exchange portion 14A of the exhaust system heat exchanger 14 is positioned in the vehicle up-down direction so that the lowermost portions 14E are above the bottom faces 76B of the tunnel side reinforcements 76 over their entire lengths in the vehicle front-rear direction. That is to say, it may be understood that the tunnel side reinforcements 76 have bottom faces 76B (lowermost portions) that are positioned in the vehicle up-down direction below the lowermost portion of the lowermost portions 14E (the lowermost portion 14E that is at the rear end of the heat exchange portion 14A), the tunnel side reinforcements 76 corresponding to the vehicle body frame of the present invention.

Furthermore, in the exhaust system heat exchanger 14 that is disposed at an inclination so as to be declined overall to the rear as described above, the lowermost portion 64A of the cooling water outlet pipe 64 that is connected at the top portion in the vicinity of the front end of the outer pipe 32, is communicated to the substantially topmost portion of the engine cooling water flow path 34 and has the functionality of the gas release portion of the present invention (described later). There is a non illustrated heater hose connected to the cooling water outlet pipe 64, and the cooling water outlet pipe 64 is communicated through the heater hose to the cooling water circuit path (water pump) of the above described internal combustion engine. In the vehicle exhaust system mounting structure 10, since the cooling water outlet pipe 64 is disposed to the front end 14B of the exhaust system heat exchanger 14, the heater hose is led in a configuration that connects the cooling water outlet pipe 64 with the internal combustion engine by the shortest distance. That is to say, it is configured such that escape may be suppressed of the heat that is recovered from the exhaust gas to the engine cooling water through the heat exchange portion 14A.

Furthermore, as shown in FIG. 3, the shift cable 94 includes a portion that passes through the top wall 70B of the floor tunnel 70, and leads out to above the exhaust system heat exchanger 14 in the vehicle up-down direction. That is to say, by the shift cable 94 being a portion that has a small amount of radiant heat from the exhaust system in the floor tunnel 70 and being arranged at the top of the exhaust system heat exchanger 14, prevention measures against heat damage may be made simple, and also the lifespan of the shift cable 94 may be increased.

Furthermore, as shown in FIG. 3, the exhaust pipe 18C that is connected at its upstream end to the exhaust system heat exchanger rear portion shell 46 of the exhaust system heat exchanger 14 is formed into a curved shape of a bottommost portion 110 between the exhaust system heat exchanger 14 and the muffler 16 (muffler inlet pipe 22). By doing so, it is configured such that condensate water condensed out of the exhaust gas that has been cooled by the heat exchange portion 14A may be exhausted from the exhaust pipe 18C without accumulating within the exhaust system heat exchanger 14 (the exhaust system heat exchanger rear portion shell 46). The condensate water that has been exhausted from the exhaust pipe 18C is vaporized (made into a mist) in the muffler 16 as the exhaust gas is exhausted, and exhausted to the outside of the system from the exhaust pipe 18E.

Explanation will now be given of the operation of the present exemplary embodiment.

In the vehicle exhaust system mounting structure 10 of the above configuration, when the temperature of the engine cooling water is low, then the valve 54 is free of the thermo-actuator 60, and the valve device 50 operates as a self-pressure valve. Due to this, under driving conditions in which the exhaust gas pressure is low, the exhaust gas guide pipe 38, that is to say the bypass flow path 36, is closed by the biasing force of the return spring 56. Therefore, the exhaust gas flows through the exhaust gas flow path 30 of the heat exchange portion 14A, and heat exchange is carried out to the engine cooling water flowing in the engine cooling water flow path 34. Due to this the internal combustion engine warm-up is assisted, and maintenance of heating may be achieved at low temperature on start up.

When the pressure of the exhaust gas increases under driving conditions, such as, for example, acceleration or hill-climbing, in which the output of the internal combustion engine increases, the valve 54 is acted on by the exhaust gas pressure, swings in the direction of arrow A against the biasing force of the return spring 56, and attains an open position. In doing so, the exhaust gas flows mainly in the bypass flow path 36, and the back pressure is reduced compared to when the exhaust gas flows in the exhaust gas flow path 30. That is to say, in the vehicle exhaust system mounting structure 10 provided with the valve device 50 functioning as a self-pressure valve, when in order to assure power output a reduction in the back pressure is given precedence over recovery of heat for warm-up of the internal combustion engine or the like, since the exhaust gas bypasses the heat exchange portion 14A and flows through bypass flow path 36, an automatic reduction in the back pressure is achieved. Then, when the internal combustion engine generates maximum power output, the valve 54 is induced by this exhaust gas pressure to the position shown by the two-dot chain lines in FIG. 10 (the greatest degree of opening by the exhaust gas pressure).

Furthermore, in the vehicle exhaust system mounting structure 10, when the temperature of the engine cooling water becomes 80° C. or greater, a push rod of the thermo-actuator 60 pushes a non illustrated lever of the rotational shaft 52 and maintains the valve 54 in the completely open position. In doing so, the exhaust gas mainly flows through the bypass flow path 36, the exhaust gas guide pipe 38, and the exhaust gas exit header 48 of the exhaust system heat exchanger rear portion shell 46, and the exhaust gas is exhausted from the exhaust pipe 18C. That is to say, when driving in conditions where there is no necessity to recover the heat from the exhaust gas, the exhaust gas flow path automatically changes to that of the bypass flow path 36.

Here, in the vehicle exhaust system mounting structure 10, since the lowermost portion 14D in the vehicle up-down direction of the exhaust system heat exchanger 14 (the exhaust system heat exchanger rear portion shell 46 in the present exemplary embodiment) is lower than the body cross-member 80, the exhaust system heat exchanger 14 is protected from road surface interference that accompanies the running of the vehicle. In particular, in the vehicle exhaust system mounting structure 10, since the front end 14B of the exhaust system heat exchanger 14 is positioned above the engine rear mount support member 90 and also the rear end 14C of the exhaust system heat exchanger 14 is positioned above body cross-member 80, road surface interference to the exhaust system heat exchanger 14 is not readily generated. That is to say, the exhaust system heat exchanger 14 may be prevented from directly receiving impact load (damage) from road surface interference.

Furthermore, in particular, in the vehicle exhaust system mounting structure 10, the left and right tunnel side reinforcements 76, between the engine rear mount support member 90 and the body cross-member 80, project in the vehicle up-down direction below the lowermost portions 14E of the each of the positions in the longitudinal direction of the exhaust system heat exchanger 14, and so the exhaust system heat exchanger 14 may be protected from road surface interference from the four directions of front, rear, left and right. However, since the left and right tunnel side reinforcements 76, between the engine rear mount support member 90 and the body cross-member 80, project in the vehicle up-down direction below the lowermost portions 14E of the exhaust system heat exchanger 14 along substantially the whole length in the longitudinal direction of the exhaust system heat exchanger 14 (the whole length excluding a portion in the vicinity of the body cross-member 80), the exhaust system heat exchanger 14 is even more effectively protected from road surface interference. In particular, the engine cooling water flowing in the heat exchange portion 14A (outer pipe 32) is even more effectively protected from road surface interference along the entire length thereof by the tunnel side reinforcements 76.

Furthermore, in the vehicle exhaust system mounting structure 10, since the exhaust system heat exchanger 14 is angled so that the front end 14B of the exhaust system heat exchanger 14 (in which there is one of the lowermost portions 14E) is positioned in the vehicle up-down direction above the rear end 14C (with the lowermost portion 14D of the lowermost portions 14E), the front end 14B in the vehicle front-rear direction of the exhaust system heat exchanger 14 may be prevented from interference by obstructions (getting snagged thereby) and the like on the road surface R accompanying the vehicle running.

Also, in the vehicle exhaust system mounting structure 10, since the body cross-member 80 is disposed lower in the vehicle up-down direction than the engine rear mount support member 90, as shown by the arrow F1 in FIG. 1, the wind from running is guided toward the heat exchange portion 14A of the exhaust system heat exchanger 14 by the body cross-member 80 (is dammed thereby). Due to this, the running wind may be made to impact the outer pipe 32 configuring the heat exchange portion 14A. Furthermore, in the vehicle exhaust system mounting structure 10, since the front portion on the top surface of the engine rear mount support member 90 is the front angled surface 108A, as shown by the arrow F2 in FIG. 1, the running wind is guided by the front angled surface 108A, and this running wind may be made to impact on the outer pipe 32 configuring the heat exchange portion 14A. By doing so, in driving conditions when the exhaust gas is flowing through the bypass flow path 36, such as during high speed running or the like, the temperature of the engine cooling water rising, raising the load on the radiator, may be prevented.

Furthermore, in the vehicle exhaust system mounting structure 10, by the cooling water outlet pipe 64 being in communication with the uppermost portion of the engine cooling water flow path 34, if foreign matter with lower specific gravity than the engine cooling water enters into the engine cooling water flow path 34, even in a state in which the circulation of the engine cooling water is ceased, the foreign matter is ejected from the cooling water outlet pipe 64. In doing so, when, for example, the internal combustion engine is stopped just after high load driving of the internal combustion engine, even if (contingency) the remaining heat of the exhaust system heat exchanger 14 were to cause the engine cooling water to boil and gas bubbles were to be generated, such gas bubbles would be ejected via the cooling water outlet pipe 64 from the engine cooling water flow path 34 of the exhaust system heat exchanger 14, and be eliminated with the cooling of the engine cooling water. That is to say, in the vehicle exhaust system mounting structure 10, accumulation of foreign matter such as gas bubbles or the like in the engine cooling water flow path 34 of the exhaust system heat exchanger 14 may be prevented.

Also, since the cooling water outlet pipe 64 is used as a gas release portion, or in other words, since foreign matter that has been ejected from the engine cooling water flow path 34 may be let out from the heat exchange portion 14A along with the circulation of the engine cooling water, there is no expansion of bubbles that have accumulated in the gas release portion due to the exhaust gas heat when an internal combustion engine is restarted. Furthermore, there is no need to provide a separate member as a gas release portion, and a configuration is realized that may prevent the accumulation of foreign matter within the engine cooling water flow path 34 without influencing the heat exchange capability.

Also, in the vehicle exhaust system mounting structure 10, since the outermost layer of the heat exchange portion 14A of the exhaust system heat exchanger 14 is configured as the engine cooling water flow path 34, or in other words, since the engine cooling water is able to carry out heat exchange to the atmosphere through the outer pipe 32 (atmospheric cooling), the generation of bubbles themselves, due to boiling of the engine cooling water, may be suppressed. Furthermore, since the cooling water outlet pipe 64 is simply provided to the outer pipe 32, the structure may be simplified.

It should be noted that, whereas an example has been given in which the cooling water outlet pipe 64 is the gas release portion of the present invention, the present invention is not limited thereto, and it is sufficient as long as basically the gas release portion of the present invention functions when the circulation of the external combustion engine has ceased. For example, it may be configured such that the flow of the engine cooling water of the engine cooling water flow path 34 is in the opposite direction and the inlet for the engine cooling water functions as the gas release portion, or the engine cooling water flow path 34 may be configured such that the engine cooling water flows along and back in the longitudinal direction of the heat exchange portion 14A, and configured such that both the inlet and the outlet of the engine cooling water function as a gas release portion.

Furthermore, in the exemplary embodiment described above an example was given in which the vehicle exhaust system mounting structure 10 exhibited the functionality of protecting the exhaust system heat exchanger 14 from road surface interference, the functionality of assisting cooling due to running wind, and the functionality of removing gas bubbles when the internal combustion engine is stopped, however the present invention is not limited thereto, and it is sufficient to configure the vehicle exhaust system mounting structure 10 such that at least one of the above described functionalities is exhibited.

Therefore, in a configuration with a gas release portion to the exhaust system heat exchanger 14 that has been disposed at an inclination such that one end in the longitudinal direction is higher in the vehicle up-down direction than the other end thereof, there is no limitation to a configuration such that the exhaust system heat exchanger 14 is protected by at least one of the body cross-member 80, engine rear mount support member 90, and/or the pair of tunnel side reinforcements 76, and there is no limitation to a configuration such that the running wind is guided to the heat exchange portion 14A.

Furthermore, in a configuration in which the body cross-member 80 is disposed in the vehicle up-down direction below the engine rear mount support member 90 such that the running wind of arrow F1 is guided, or in a configuration in which the running wind of arrow F2 is guided by the front angled surface 108A of the engine rear mount support member 90, there is no limitation to configuring such that the exhaust system heat exchanger 14 is protected by at least one of the body cross-member 80, engine rear mount support member 90, and/or the pair of tunnel side reinforcements 76, and there is no limitation to a configuration in which a gas release portion is provided. In such cases, the guide member that generates the running wind of F1 is not limited to being configured from the vehicle body frame.

Furthermore, in a configuration in which the exhaust system heat exchanger 14 is protected by at least one of the body cross-member 80, engine rear mount support member 90 and/or the pair of tunnel side reinforcements 76, there is no limitation to a configuration in which the running wind is guided to the heat exchange portion 14A, and there is no limitation to a configuration in which a gas release portion is provided, and there is no limitation to a configuration in which the exhaust system heat exchanger 14 is disposed at an angle.

Moreover, in the exemplary embodiment described above, an example is given in which the exhaust system heat exchanger 14 has its length substantially along the vehicle front-rear direction, however the present invention is not limited thereto, and the exhaust system heat exchanger 14 may be disposed at an angle to the vehicle front-rear direction when seen in plan view, or disposed along the vehicle width direction.

The foregoing description of the exemplary embodiments of the present exemplary embodiment is provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A vehicle body mounting structure that mounts an exhaust system heat exchanger that is disposed at a bottom side of a vehicle body floor such that a lowermost portion of the exhaust system heat exchanger carrying out heat exchange between exhaust gas and a cooling medium is positioned in a vehicle up-down direction above a lowermost portion in the vehicle up-down direction of a vehicle body frame, wherein the vehicle body frame comprises:
   a first member that is positioned in the vehicle up-down direction completely below one end side in a longitudinal direction of the exhaust system heat exchanger; and
   a second member that is positioned in the vehicle up-down direction completely below an other end side in the longitudinal direction of the exhaust system heat exchanger.

2. The vehicle body mounting structure of claim 1, wherein:
   the longitudinal direction of the exhaust system heat exchanger is along substantially a vehicle front-rear direction;
   the first member is disposed in the vehicle front-rear direction in front of the second member; and
   a lowermost portion of the first member in the vehicle up-down direction is positioned in the vehicle up-down direction above a lowermost portion of the second member in the vehicle up-down direction.

3. The vehicle body mounting structure of claim 2, wherein:
   a topside face in the vehicle up-down direction of the first member comprises an inclined angled face, positioned such that a rear side of the angled face in the vehicle front-rear direction is above a front side of the angled face in the vehicle up-down direction.

4. The vehicle body mounting structure of claim 1, wherein:
   the longitudinal direction of the exhaust system heat exchanger is substantially along a vehicle front-rear direction and the exhaust system heat exchanger is disposed such that a front side in the vehicle front-rear direction of the exhaust system heat exchanger is positioned in the vehicle up-down direction above a rear side of the exhaust system heat exchanger.

5. The vehicle body mounting structure of claim 4, wherein the exhaust system heat exchanger comprises a flow path provided such that a cooling liquid that is the cooling medium flows there through, and a gas release portion is communicated, from a topside in the vehicle up-down direction, to an uppermost portion, in the vehicle up-down direction, of the flow path of the cooling liquid.

6. The vehicle body mounting structure of claim 5, wherein the gas release portion is at least one of a cooling liquid inlet portion or a cooling liquid outlet portion of the flow path in the exhaust system heat exchanger.

7. The vehicle body mounting structure of claim 6, wherein:
   a shell forming an external profile of the exhaust system heat exchanger is configured as an outer wall to the flow path; and
   the gas release portion is provided to an uppermost portion in the vehicle up-down direction of the shell.

8. The vehicle body mounting structure of claim 5, wherein:
   a shell forming an external profile of the exhaust system heat exchanger is configured as an outer wall to the flow path; and
   the gas release portion is provided to an uppermost portion in the vehicle up-down direction of the shell.

9. A vehicle body mounting structure that mounts an exhaust system heat exchanger that is disposed at a bottom side of a vehicle body floor such that a lowermost portion of the exhaust system heat exchanger carrying out heat exchange between exhaust gas and a cooling medium is positioned in a vehicle up-down direction above a lowermost portion in the vehicle up-down direction of a vehicle body frame, wherein:
   a longitudinal direction of the exhaust system heat exchanger is along substantially a vehicle front-rear direction and the exhaust system heat exchanger is disposed in a floor tunnel provided at the vehicle body floor; and
   the vehicle body frame comprises
      a pair of tunnel side reinforcements, a longitudinal direction of each of the tunnel side reinforcements being substantially along the vehicle front-rear direction, and the pair of tunnel side reinforcements being provided so as to project, from edge portions at both sides in a vehicle width direction in an opening that faces down in the vehicle up-down direction of the floor tunnel in the vehicle body floor, below the exhaust system heat exchanger in the vehicle up-down direction.

10. The vehicle body mounting structure of claim 9, wherein:
   the longitudinal direction of the exhaust system heat exchanger is substantially along the vehicle front-rear direction and the exhaust system heat exchanger is disposed such that a front side in the vehicle front-rear direction of the exhaust system heat exchanger is positioned in the vehicle up-down direction above a rear side of the exhaust system heat exchanger.

11. A vehicle body mounting structure comprising:
   an exhaust system heat exchanger that is disposed at a bottom side of a vehicle body floor with a longitudinal direction of the exhaust system heat exchanger being substantially along a vehicle front-rear direction, the exhaust system heat exchanger carrying out heat exchange between exhaust gas and a cooling medium;
   a first member that is positioned in a vehicle up-down direction below a front end side in the longitudinal direction of the exhaust system heat exchanger; and
   a second member that is positioned in the vehicle up-down direction below a rear end side in the longitudinal direction of the exhaust system heat exchanger, a lowermost portion of the second member in the vehicle up-down direction being positioned in the vehicle up-down direction below a lowermost portion of the first member in the vehicle up-down direction.

12. The vehicle body mounting structure of claim 11, wherein:
a topside face in the vehicle up-down direction of the first member comprises an inclined angled face, positioned such that a rear side of the angled face in the vehicle front-rear direction is above a front side of the angled face in the vehicle up-down direction.

13. The vehicle body mounting structure of claim 11, wherein:
the longitudinal direction of the exhaust system heat exchanger is substantially along the vehicle front-rear direction and the exhaust system heat exchanger is disposed such that a front side in the vehicle front-rear direction of the exhaust system heat exchanger is positioned in the vehicle up-down direction above a rear side of the exhaust system heat exchanger.

14. The vehicle body mounting structure of claim 13, wherein the exhaust system heat exchanger comprises a flow path provided such that a cooling liquid that is the cooling medium flows there through, and a gas release portion is communicated, from a topside in the vehicle up-down direction, to an uppermost portion, in the vehicle up-down direction, of the flow path of the cooling liquid.

15. The vehicle body mounting structure of claim 14, wherein the gas release portion is at least one of a cooling liquid inlet portion or a cooling liquid outlet portion of the flow path in the exhaust system heat exchanger.

16. A vehicle body mounting structure comprising:
an exhaust system heat exchanger that is disposed at a bottom side of a vehicle body floor with a longitudinal direction of the exhaust system heat exchanger being substantially along a vehicle front-rear direction, the exhaust system heat exchanger carrying out heat exchange between exhaust gas and a cooling medium; and
a vehicle body frame member that is disposed in a vehicle up-down direction below a front end side of the exhaust system heat exchanger, the vehicle body frame member having an angled face inclined so as to face up in the vehicle up-down direction and face forward in the vehicle front-rear direction.

17. The vehicle body mounting structure of claim 16, wherein:
the longitudinal direction of the exhaust system heat exchanger is substantially along the vehicle front-rear direction and the exhaust system heat exchanger is disposed such that a front side in the vehicle front-rear direction of the exhaust system heat exchanger is positioned in the vehicle up-down direction above a rear side of the exhaust system heat exchanger.

18. The vehicle body mounting structure of claim 17, wherein the exhaust system heat exchanger comprises a flow path provided such that a cooling liquid that is the cooling medium flows there through, and a gas release portion is communicated, from a topside in the vehicle up-down direction, to an uppermost portion, in the vehicle up-down direction, of the flow path of the cooling liquid.

19. The vehicle body mounting structure of claim 18, wherein the gas release portion is at least one of a cooling liquid inlet portion or a cooling liquid outlet portion of the flow path in the exhaust system heat exchanger.

20. The vehicle body mounting structure of claim 18, wherein:
a shell forming an external profile of the exhaust system heat exchanger is configured as an outer wall to the flow path; and
the gas release portion is provided to an uppermost portion in the vehicle up-down direction of the shell.

21. A vehicle body mounting structure comprising:
an exhaust system heat exchanger that is disposed at an inclination such that one end side in a longitudinal direction of the exhaust system heat exchanger is positioned in a vehicle up-down direction above an other end side of the exhaust system heat exchanger, the exhaust system heat exchanger carrying out heat exchange between exhaust gas and a cooling liquid; and
a gas release portion provided so as to be communicated, from a topside in the vehicle up-down direction, to an uppermost portion, in the vehicle up-down direction, of a flow path of the cooling liquid of the exhaust system heat exchanger.

22. The vehicle body mounting structure of claim 21, wherein the gas release portion is at least one of a cooling liquid inlet portion or a cooling liquid outlet portion of the flow path in the exhaust system heat exchanger.

23. The vehicle body mounting structure of claim 21, wherein:
a shell forming an external profile of the exhaust system heat exchanger is configured as an outer wall to the flow path; and
the gas release portion is provided to an uppermost portion in the vehicle up-down direction of the shell.

* * * * *